United States Patent
Samuel et al.

(10) Patent No.: US 11,525,942 B2
(45) Date of Patent: Dec. 13, 2022

(54) DECOMPOSED FRICTION FACTOR CALIBRATION

(71) Applicant: Landmark Graphics Corporation, Houston, TX (US)

(72) Inventors: Robello Samuel, Cypress, TX (US); Manish Kumar Mittal, Cypress, TX (US)

(73) Assignee: Landmark Graphics Corporation, Houston, TX (US)

(*) Notice: Subject to any disclaimer, the term of this patent is extended or adjusted under 35 U.S.C. 154(b) by 188 days.

(21) Appl. No.: 17/118,150

(22) Filed: Dec. 10, 2020

(65) Prior Publication Data
US 2022/0187494 A1    Jun. 16, 2022

(51) Int. Cl.
*G01V 13/00*     (2006.01)
*E21B 44/00*     (2006.01)

(52) U.S. Cl.
CPC .............. *G01V 13/00* (2013.01); *E21B 44/00* (2013.01)

(58) Field of Classification Search
None
See application file for complete search history.

(56) References Cited

U.S. PATENT DOCUMENTS

| | | | |
|---|---|---|---|
| 5,660,239 A * | 8/1997 | Mueller | E21B 7/04 175/57 |
| 6,026,912 A | 2/2000 | King et al. | |
| 7,142,986 B2 | 11/2006 | Moran | |
| 9,202,169 B2 | 12/2015 | Al-Yami et al. | |
| 2011/0144960 A1* | 6/2011 | Weng | E21B 44/00 703/2 |
| 2012/0059521 A1 | 3/2012 | Iversen et al. | |

(Continued)

FOREIGN PATENT DOCUMENTS

| | | |
|---|---|---|
| EP | 1608843 A1 | 12/2005 |
| WO | 2019118055 A1 | 6/2019 |
| WO | 2019147297 A1 | 8/2019 |

OTHER PUBLICATIONS

PCT Written Opinion of the International Searching Authority (dated 2021).*

(Continued)

*Primary Examiner* — Lina M Cordero
(74) *Attorney, Agent, or Firm* — Benjamin Ford; Parker Justiss, P.C.

(57) ABSTRACT

The disclosure presents processes and methods for decomposing friction factors and generating a calibrated friction factor and adjusted input parameters. The calibrated friction factor and adjusted input parameters can be utilized by a borehole system as an input to adjust borehole operations to improve the operational efficiency. The friction factors can be decomposed by type, such as geometrical, geomechanical, mechanical, and fluid. The disclosure also presents processes and methods for identifying an outlier portion of a friction factor, as identified by a deviation threshold that can be used to identify adjustments to borehole operations in that portion of the borehole. A system is disclosed that is capable of implementing the processes and methods in a borehole operation system, such as a downhole system, a surface system, or a distant system, for example, a data center, cloud environment, lab, corporate office, or other location.

20 Claims, 8 Drawing Sheets

(56) References Cited

U.S. PATENT DOCUMENTS

| | | | |
|---|---|---|---|
| 2015/0247396 A1* | 9/2015 | Tunc | E21B 44/00 700/275 |
| 2015/0361779 A1* | 12/2015 | Haq | E21B 3/00 702/9 |
| 2017/0098020 A1* | 4/2017 | Samuel | G06F 30/20 |
| 2018/0305989 A1* | 10/2018 | Oyedokun | E21B 17/20 |

OTHER PUBLICATIONS

Elgibaly, et al.; "A study of friction factor model for directional wells"; Egyptian Petroleum Research Institute; Egyptian Journal of Petroleum; 2017; 16 pgs.

* cited by examiner

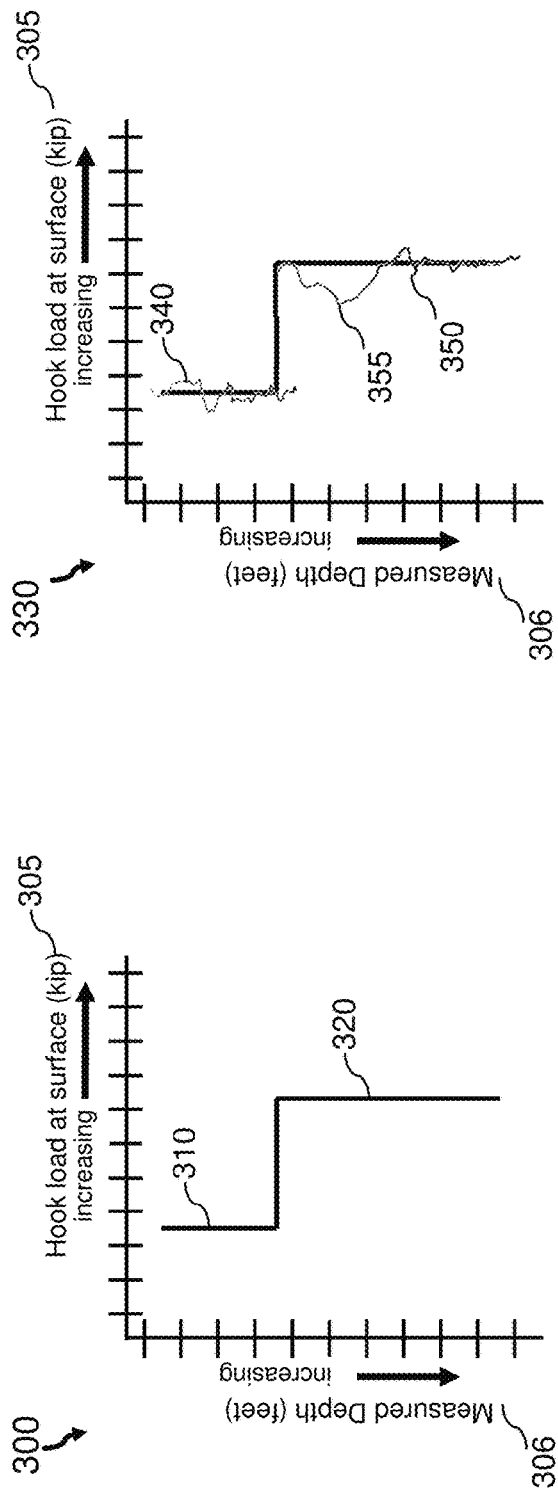
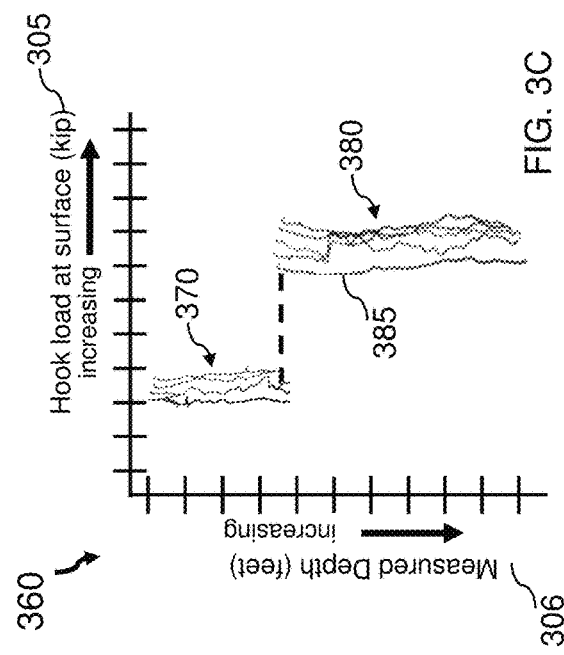
FIG. 3A
FIG. 3B
FIG. 3C

DECOMPOSED FRICTION FACTOR CALIBRATION

TECHNICAL FIELD

This application is directed, in general, to improving borehole operation efficiency and, more specifically, to using friction factors to enable adjustments to borehole operations.

BACKGROUND

In developing a borehole, one factor affecting borehole operations can be friction. Friction can affect the wear of equipment, alter the characteristics of the surrounding formation of the borehole, and decrease borehole operation efficiency. Conventionally, friction is estimated as one factor for a section or portion of the borehole. It would be beneficial to be able to improve the accuracy of the friction factor for a portion of the borehole to improve the operational efficiency of borehole operations in that portion of the borehole.

SUMMARY

In one aspect a method to calibrate an estimated single friction factor for a borehole operation is disclosed. In one embodiment, the method includes (1) receiving data, wherein the data includes initial input parameters and sensor data, (2) decomposing the sensor data into one or more decomposed friction factors using the initial input parameters, and (3) comparing the one or more decomposed friction factors to the estimated single friction factor using the initial input parameters, wherein the initial input parameters are modified to generate adjusted input parameters using results of the comparing, where the one or more decomposed friction factors and the estimated single friction factor apply to a same portion of a borehole undergoing the borehole operation.

In a second aspect, a system to adjust a borehole operation utilizing a calibrated friction factor is disclosed. In one embodiment, the system includes (1) a data transceiver, capable of receiving initial input parameters and sensor data from one or more of downhole sensors, surface sensors, a data store, a previous survey data, a well site controller, or a first computing system, (2) a result transceiver, capable of communicating the calibrated friction factor, one or more decomposed friction factors, and adjusted input parameters to a borehole operation system, and (3) a decomposed friction calculator, capable of using the sensor data and the initial input parameters to decompose the sensor data to generate one or more decomposed friction factors, to modify the initial input parameters to generate the adjusted input parameters, and to generate the calibrated friction factor.

In a third aspect, a computer program product having a series of operating instructions stored on a non-transitory computer-readable medium that directs a data processing apparatus when executed thereby to perform operations to calibrate an estimated single friction factor for a borehole operation is disclosed. In one embodiment, the operations include (1) receiving data, wherein the data includes initial input parameters and sensor data, (2) decomposing the sensor data into one or more decomposed friction factors using the initial input parameters, and (3) comparing the one or more decomposed friction factors to the estimated single friction factor using the initial input parameters, wherein the initial input parameters are modified to generate adjusted input parameters using results of the comparing, where the one or more decomposed friction factors and the estimated single friction factor apply to a same portion of a borehole undergoing the borehole operation.

BRIEF DESCRIPTION

Reference is now made to the following descriptions taken in conjunction with the accompanying drawings, in which:

FIG. 3A is an illustration of a diagram of an example chart demonstrating an estimated friction factor;

FIG. 3B is an illustration of a diagram of an example chart demonstrating a calibration variation for the friction factor;

FIG. 3C is an illustration of a diagram of an example chart demonstrating decomposed friction factors;

DETAILED DESCRIPTION

Figure 1:
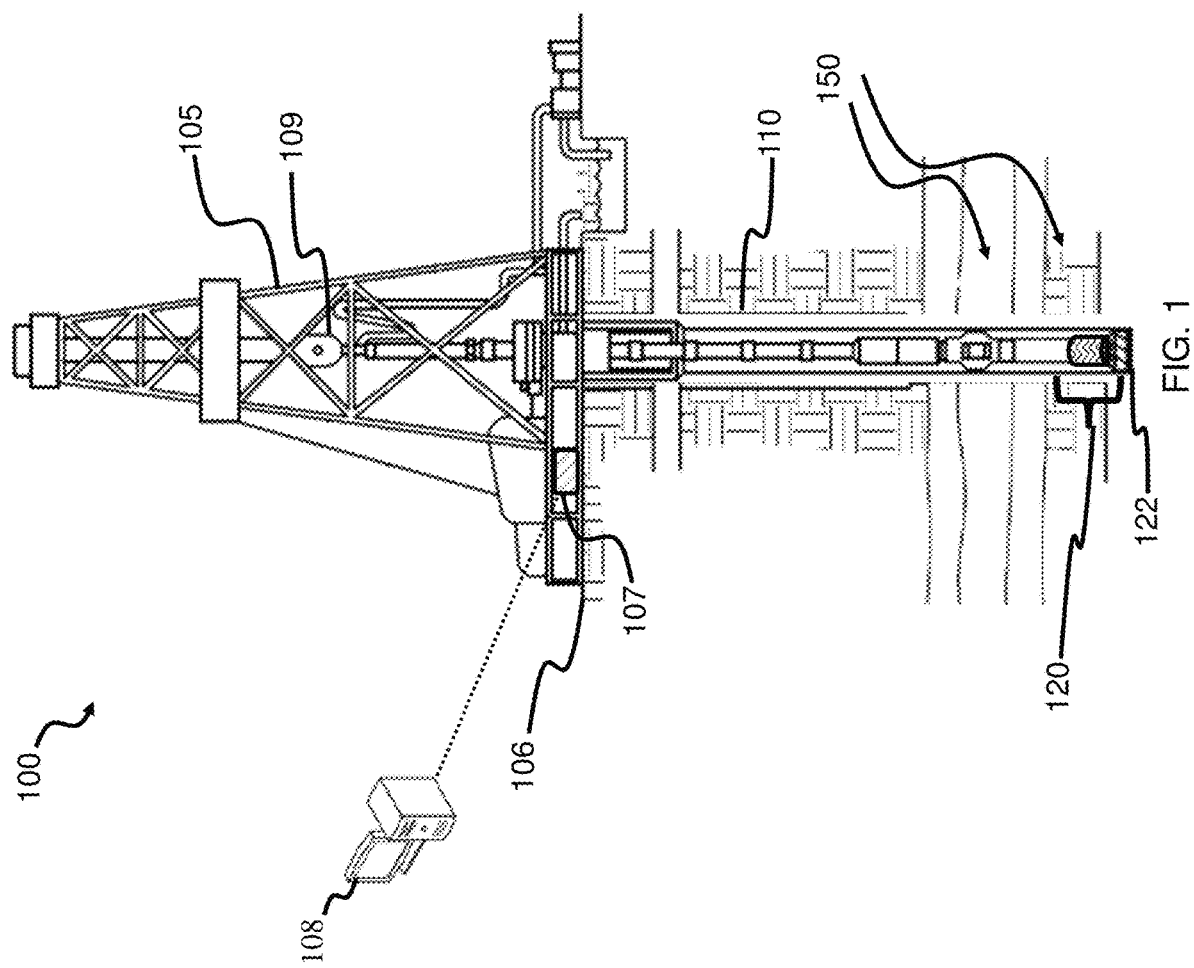
FIG. 1 is an illustration of a diagram of an example borehole operation computing a calibrated friction factor.

When developing a borehole, borehole operations can be affected by friction in one or more portions of the borehole. For example, a drilling fluid can accumulate cuttings and thereby increase the friction force against a rotating drill pipe, or the drill pipe can experience friction against a casing or subterranean formation, such as in a bend or dogleg portion of the borehole. A borehole can be developed for hydrocarbon production purposes, scientific purposes, or for other purposes that have operations occurring within a borehole.

Conventionally, the friction force can be estimated as a single friction coefficient, e.g., factor, for a particular portion of the borehole. In some aspects, the portion of the borehole can be determined as the portion extending from a first survey station to a second survey station. In some aspects, in continuous survey operations, the portion can be determined as a certain number of feet, for example, forty feet or other length values. The contributing friction factors are not typically utilized for estimation purposes when a borehole is designed or drilled and completed in real-time or near real-time.

The estimated single friction coefficient can be compared to actual friction experienced during borehole operations, such as detected by one or more downhole sensors or surface sensors at a surface location, such as a hook-load sensor. The estimated single friction coefficient can be calibrated based on the actual friction experienced. The calibrated single friction coefficient can then be used as an input into other systems, for example, a borehole operation plan where adjustments can be made to fluid composition, fluid flow rates, rate of rotation speed of the drill string, and other factors to improve operational efficiency of the borehole, thereby lowering costs. The calibrated single friction coefficient can be used to estimate downhole conditions over a subsequent time period or a subsequent portion of the borehole.

This disclosure presents processes and methods to improve the accuracy of the single friction coefficient, thereby providing higher quality information to other systems and users which can be subsequently used to improve the efficiency of the borehole operations. The single friction coefficient can be decomposed into one or more components, i.e., friction factors, where each of the decomposed friction factors can be separately estimated and calibrated against measured and collected sensor data. Estimating and calibrating each friction factor separately from the other friction factors can improve the accuracy of the combined, i.e., calculated, friction factor. In some aspects, each decomposed friction factor can be analyzed independent of the other decomposed friction factors to determine which one or more decomposed friction factors are driving a deviation from the calibration line. Adjustments can be made to the borehole operations to bring these one or more identified decomposed friction factors closer to the measured friction of the borehole operation.

Knowing more details about the components of the single friction coefficient can provide better information to the borehole system or user to improve borehole operational efficiency. The components can be communicated as inputs into systems to determine specific adjustments to the borehole operations and to improve estimations on wear and tear of downhole equipment. For example, the composition of drilling fluid can be adjusted, a pump out operation can be scheduled, rotational speed of the drill string can be adjusted, and other adjustments can be made. In some aspects, the system using the friction factors can be a downhole system, for example, a bottom hole assembly (BHA), a drilling system, a geo-steering system, and other downhole systems. In some aspects, the system using the friction factors can be a surface or near surface system, such as a well site controller or a surface computing system. A user can be a borehole engineer, operator, or another type of user.

In some aspects, the friction factor analysis can be conducted in real-time or near real-time. In some aspects, the described processes can be used to estimate the sustainability during the life of the borehole. In some aspects, the described processes can be used in real-time or near real-time to adjust the drilling parameters or the borehole operation plan. In some aspects, the described processes can be used to predict problems or issues prior to being encountered by the borehole operation.

Generally, the calibrated friction factor can be computed from a decomposed form of the friction data. For an interval of measured depth, for example, 40.0 feet, or another interval, the one or more contributing factors for the friction factor can be computed and combined to generate the calibrated friction factor, such as shown in Equation 1.

$$CRi = f_1 + f_2 + f_3 + \ldots + f_n \quad \text{Equation 1: Example calibrated friction factor}$$

where $f_x$ are the decomposed friction factor functions, and CRi is the calibrated friction factor.

In some aspects, the calibrated friction factor can be represented by specific types or groups of friction factors, for example, geomechanical, mechanical, fluid, geomechanical, and other types. Equation 2 shows the calibrated friction factor using these types of factors.

$$CRi = \text{geometrical} + \text{mechanical} + \text{fluid} + \text{geomechanical} + \ldots \quad \text{Equation 2: Example calibrated friction factor using types of friction}$$

The data used as input for each of the included decomposed friction factors can be computed from offset boreholes, prior collected data, or from real-time or near real-time data received from sensors. Geometrical friction factors can include zero or more of a borehole curvature (such as a dogleg), a borehole torsion, an inclination, an azimuth, or other geometrical friction factors. Mechanical friction factors can include zero or more of a push force, a maximum bending, a maximum bending stress, a fatigue ratio, or other mechanical friction factors. Fluid friction factors can include zero or more of a viscous drag, a cuttings drag, or other fluid friction factors. Geomechanical friction factors can include zero or more of a borehole instability, a rotational speed of downhole equipment, or other geomechanical friction factors.

Turning now to the figures, FIG. 1 is an illustration of a diagram of an example borehole operation 100 computing a calibrated friction factor. Borehole operation 100 can be a drilling system, a logging while drilling (LWD) system, a measuring while drilling (MWD) system, a seismic while drilling (SWD) system, a telemetry while drilling (TWD) system, and other hydrocarbon well systems, such as a relief well or an intercept well. Drilling well system 100 includes a derrick 105, a well site controller 107, and a computing system 108. Well site controller 107 includes a processor and a memory and is configured to direct operation of well system 100. Derrick 105 is located at a surface 106.

Derrick 105 includes a traveling block 109 that includes a drill string hook. Traveling block 109 includes sensors to collect data on hook-load and torque experienced at traveling block 109. Extending below derrick 105 is a borehole 110 with downhole tools 120 at the end of a drill string. Downhole tools 120 can include various downhole tools and BHA, such as drilling bit 122. Other components of downhole tools 120 can be present, such as a local power supply (e.g., generators, batteries, or capacitors), telemetry systems, sensors, transceivers, and control systems. The sensors can be sensors that provide one or more friction factors to other systems. Borehole 110 is surrounded by subterranean formation 150.

Well site controller 107 or computing system 108 which can be communicatively coupled to well site controller 107, can be utilized to communicate with downhole tools 120, such as sending and receiving telemetry, data, instructions, and other information, including friction factor parameters, such as the distance interval between calculations, weighting parameters, and other input parameters. Computing system 108 can be proximate well site controller 107 or be a distance away, such as in a cloud environment, a data center, a lab, or a corporate office. Computing system 108 can be a laptop, smartphone, PDA, server, desktop computer, cloud computing system, other computing systems, or a combination thereof, that are operable to perform the processes and methods described herein. Well site operators, engineers, and other personnel can send and receive data, instructions, measurements, and other information by various conventional means with computing system 108 or well site controller 107.

In some aspects, a friction factor processor can be part of well site controller 107 or computing system 108. The friction factor processor can receive the friction parameters, such as from a data source, previous survey data, real-time or near real-time data received from sensors downhole or at a surface location, and perform the methods and processes disclosed herein. The results of the calculations can be communicated to a drilling operations system, a geo-steering system, or other well site system or user where the results can be used as inputs to direct further borehole operations. In some aspects, computing system 108 can be located with downhole tools 120 and the computations can be completed at the downhole location. The results can be communicated to a drilling system or to a drilling operation system downhole or at a surface location.

FIG. 1 depicts an onshore operation. Those skilled in the art will understand that the disclosure is equally well suited for use in offshore operations. FIG. 1 depicts a specific borehole configuration, those skilled in the art will understand that the disclosure is equally well suited for use in boreholes having other orientations including vertical boreholes, horizontal boreholes, slanted boreholes, multilateral boreholes, and other borehole types.

Figure 2:
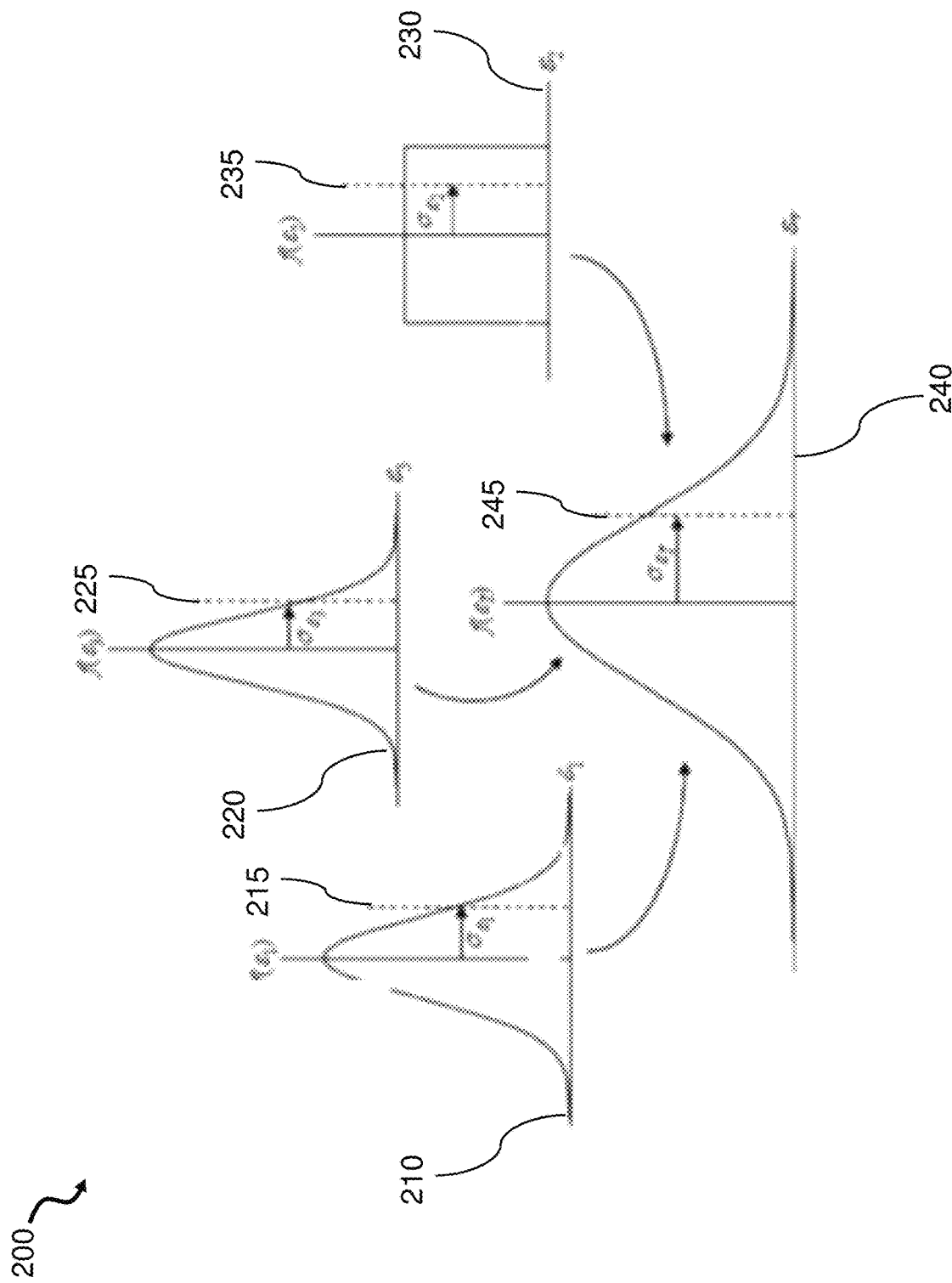
FIG. 2 is an illustration of diagrams of an example weight distributions used in calculating friction factors.

FIG. 2 is an illustration of diagrams of example weight distributions 200 used in calculating friction factors. The borehole life cycle can involve several non-linear system and asymmetric inputs, for example, variations and errors in log data, survey data, and other data sources, variations and errors in drilling parameters, borehole engineering and life cycle model uncertainties, models that can be simplified for the borehole operation, computational uncertainties, and other variations that can occur in borehole operations. Uncertainty analysis can provide an opportunity to calculate risks involved while avoiding assigning preferential weightage to some of the components. The method can estimate the influence of various parameters on the sustainability index. This can provide a method for performing more in depth sensitivity analysis on input variables on the output sustainability index. It can help provide an understanding of the risk involved based on the outcome of the output. There are many techniques available to estimate uncertainty in the model, such as a stochastic multi-criteria decision analysis method.

Figure 4:
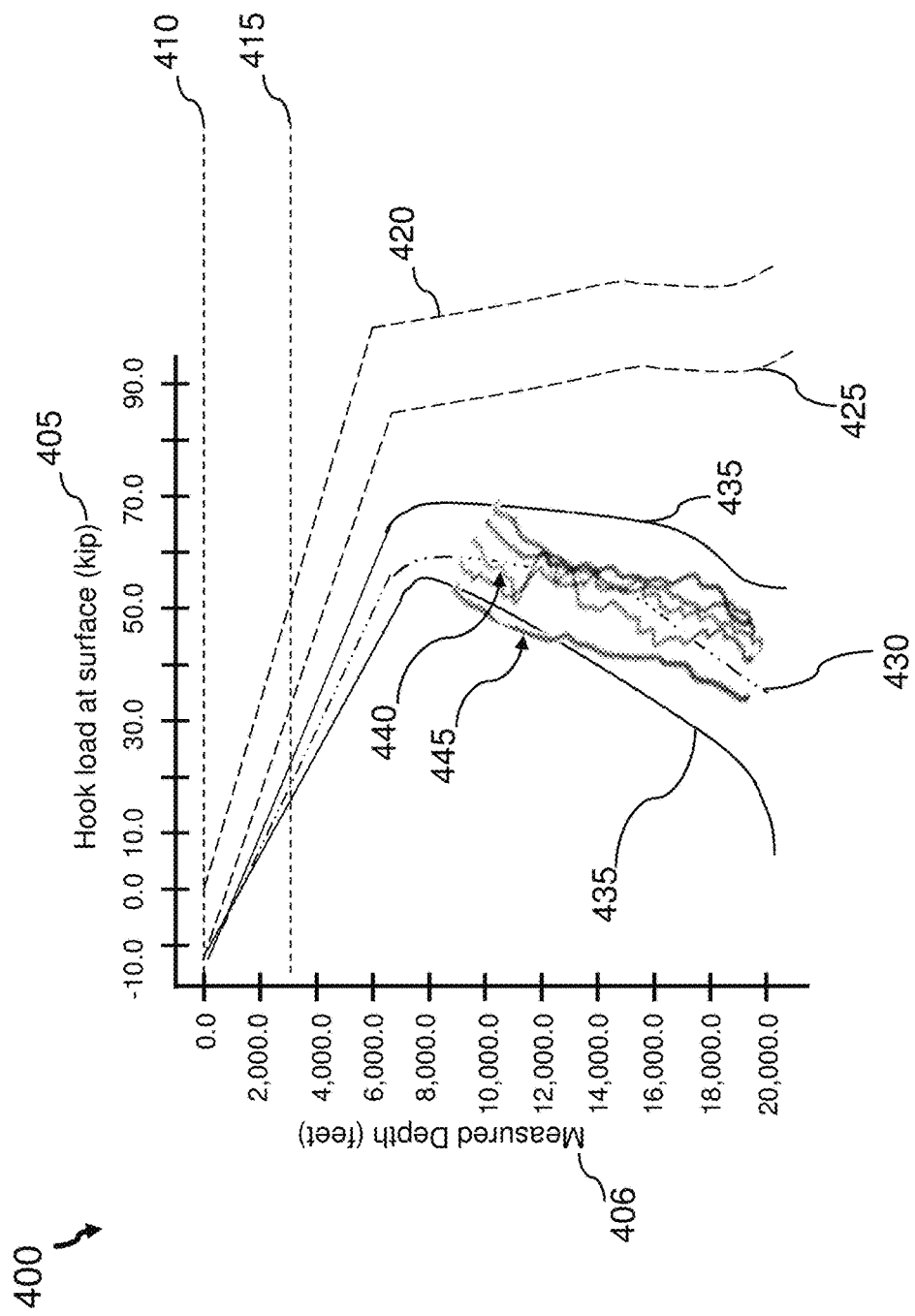
FIG. 4 is an illustration of a diagram of an example chart demonstrating an uncertainty analysis for decomposed friction factors.

Weight distributions 200 demonstrates one such technique, such as a first weight distribution curve 210 with one standard deviation shown as line 215, a second weight distribution curve 220 with one standard deviation shown as line 225, and third weight distribution curve 230 with one standard deviation shown as line 235. In some aspects, there can be fewer weight distribution curves used in the computation. In some aspects, there can be additional weight distribution curves used in the computation. In some aspects, the selected weight distribution curves can be combined into a computed weight distribution curve 240 with one standard deviation shown as line 245. Computed weight distribution curve 240 can be utilized, for example, to identify the uncertainty range of each decomposed friction factor (as shown in FIG. 4).

FIG. 3A is an illustration of a diagram of an example chart 300 demonstrating an estimated single friction factor. The estimated single friction factor can be determined from existing data, such as previous surveys or data sources. Chart 300 has an x-axis 305 showing the hook load, in kip units, at the surface increasing to the right. A y-axis 306 shows the measured depth in feet where the depth increases in the downward direction. In the first vertical section of the borehole, the friction coefficient is shown by line 310. After a dogleg portion of the borehole, the second vertical section of the borehole has a friction coefficient as shown by line 320.

FIG. 3B is an illustration of a diagram of an example chart 330 demonstrating a calibration variation for the friction coefficient. Chart 330 builds on chart 300 by overlaying received friction data from sensors downhole, along the borehole, and at the surface. Line 340 aligns with the first vertical section of the borehole (line 310) and shows that the calibration of the friction coefficient is close to the observed sensor data and therefore can be efficiently used in borehole operation planning. Line 350 aligns with the second vertical section of the borehole (line 320) and shows that the calibration of the friction coefficient does not align with the observed sensor data, as shown by outlier portion 355. This can lead to inefficient borehole operations when working in this portion of the borehole. This disclosure can provide more detail into which friction factor is driving the outlier portion 355, as shown in FIG. 3C.

FIG. 3C is an illustration of a diagram of an example chart 360 demonstrating decomposed friction factors. Chart 360 builds on chart 300 by overlaying several decomposed friction factors. By identifying and overlaying one or more decomposed friction factors, the decomposed friction factors that drive outlier data points, such as outlier portion 355, can be identified. That information can be provided to the borehole operation plan or systems enabling more efficient operational adjustments, thereby lowering costs and improving borehole operation efficiency.

Chart 360 demonstrates several decomposed friction factors 370 aligning with the first vertical section of the borehole (line 310). Chart 360 demonstrates several decomposed friction factors 380 aligning with the second vertical section of the borehole (line 320). Line 385, representing one decomposed friction factor, stays relatively linear compared to the other decomposed friction factors over the length of outlier portion 355. Line 385 appears to be the driving force for the difference between the received sensor data, e.g., observed friction factors, and the calibration line. The decomposed friction factor represented by line 385 can be utilized by the borehole operations to adjust the operations to improve borehole efficiency. For example, drilling fluid composition can be adjusted, rotational speed of the drill string can be adjusted, fewer or additional flush or pump-outs can be scheduled, drill string tripping speed can be adjusted for that portion of the borehole, and other operational parameters can be adjusted.

FIG. 4 is an illustration of a diagram of an example chart 400 demonstrating an uncertainty analysis for decomposed friction factors. Similar to FIGS. 3A, 3B, and 3C, chart 400 has an x-axis 405 showing the hook load at a surface point in kip units. Chart 400 has a y-axis 406 showing the measured depth in feet. In the plot area of chart 400, dashed line 410 shows the surface elevation. Dashed line 415 shows a change from casing sections of the borehole (above the line, closer to the surface) and uncased sections of the borehole (below the line, deeper in the borehole).

Dashed line 420 and dashed line 425 show estimated hook-loads for various borehole operations, for example, operations can be drilling, drill stuck, drill sliding, trip in or trip out, fluid pump in or fluid pump out, extraction, survey and measurement tool and sensor operations, and other borehole operations. Each operation can have its own set of decomposed friction factors that apply for the selected operation and the selected portion of the borehole.

An additional borehole operation is represented by hook-load dash-dot line 430. Using the computed weight distributions, as demonstrated in FIG. 2, one standard deviation lines 435 can be determined and plotted. Lines 435 can be used to compensate for the uncertainties of borehole development and operations as described in FIG. 2.

Lines 435 can be used to identify an outlier portion of one or more decomposed friction factors. In some aspects, this analysis can be used to further calibrate the calibrated friction factor for this portion of the borehole. In some aspects, this analysis can be used to further adjust the borehole operations when operating in this portion of the borehole. Various decomposed friction factors 440 are plotted in chart 400. One decomposed friction factor has a portion that falls outside of lines 435 at a borehole portion 445. Borehole operations can be adjusted to compensate for the identified decomposed friction factor when operating in borehole portion 445.

FIGS. 2-4 show visual charts and graphs to demonstrate the concepts disclosed herein. The disclosed processes and methods can be implemented in a computing system without a visual component. In some aspects, a visual component can be generated, such as for use by a user.

Figure 5A:
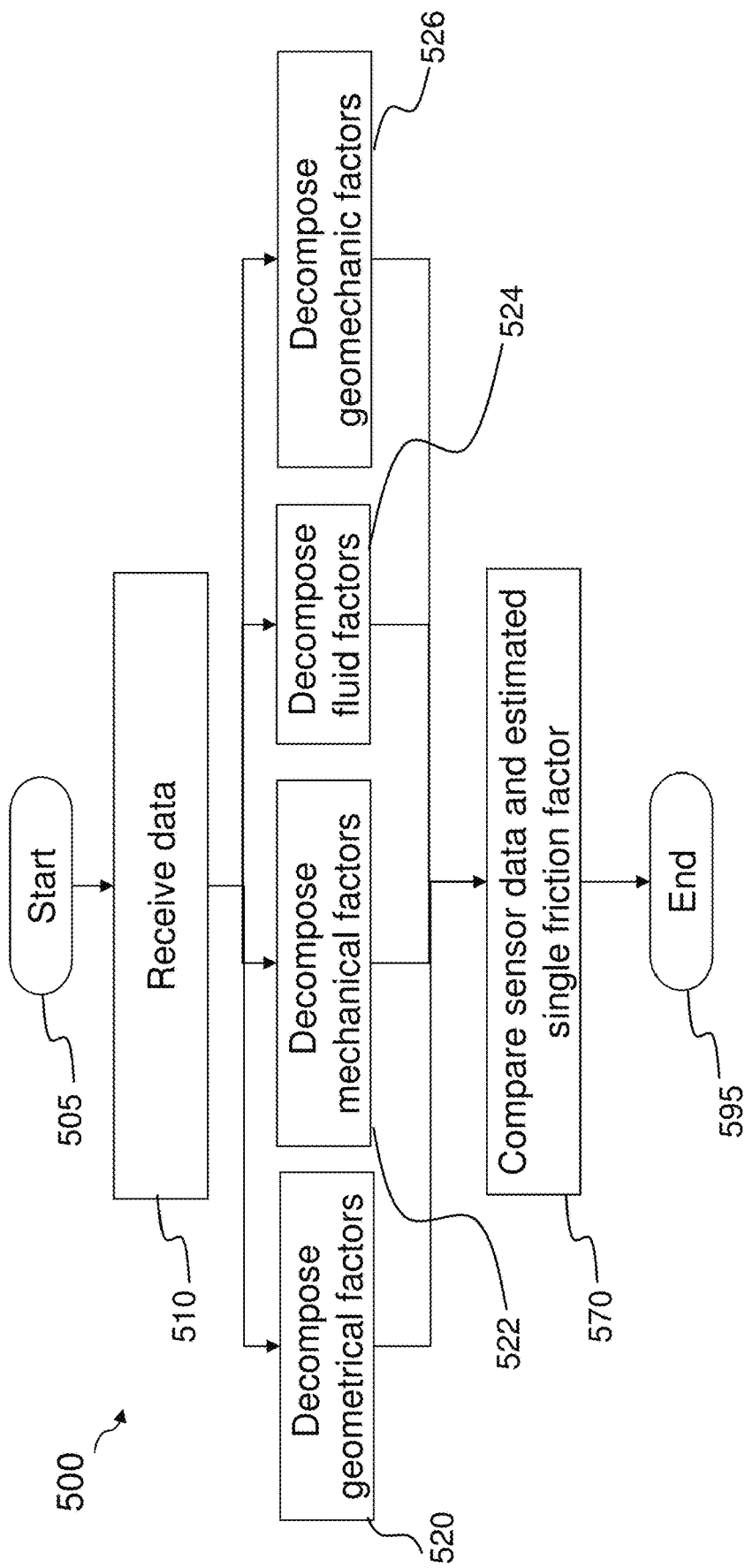
FIG. 5A is an illustration of a flow diagram of an example method for decomposing friction factors.

FIG. 5A is an illustration of a flow diagram of an example method 500 for decomposing friction factors. Method 500 can be performed on a computing system, such as a well site controller, a geo-steering system, a BHA, or other computing system capable of receiving the various survey parameters and inputs, and capable of communicating with equipment or a user at a borehole site. Other computing systems can be a smartphone, PDA, laptop computer, desktop computer, server, data center, cloud environment, or other computing system. Method 500 can be encapsulated in software code or in hardware, for example, an application, code library, dynamic link library, module, function, RAM, ROM, and other software and hardware implementations. The software can be stored in a file, database, or other computing system storage mechanism. Method 500 can be partially implemented in software and partially in hardware. Method 500 can perform the operations within the computing system or, in some aspects, generate a visual component, for example, a chart or graph showing the decomposed friction factors overlaid with a weighted distribution curve.

Method 500 starts at a step 505 and proceeds to a step 510. In step 510, data can be received, e.g., initial input parameters, where the data can be pre-existing friction factors, friction factors from a data source, friction factors derived from real-time or near real-time measurements collected downhole or at a surface location, and other input parameters, for example, a weight distribution model, a type of borehole operation, a set of decomposed friction factors, a distance interval (such as every 40 feet) for performing the method, and other input parameters. The data source can be one or more various data sources, such as a well site controller, a server, laptop, PDA, desktop computer, database, file store, cloud storage, data center, or other types of data stores, and be located downhole, at a surface location, proximate the borehole, a distance from the borehole, in a lab, an office, a data center, or a cloud environment.

From step 510, method 500 proceeds to one or more of a step 520, a step 522, a step 524, or a step 526, where each of these steps can be performed serially, in parallel, partially overlapping, or various combinations thereof. The steps selected for performance can vary according to the borehole operation. For example, a trip out of a drill string can utilize a different set of decomposed friction factors than a drilling operation.

In step 520, the geometrical factors can be decomposed from the received data from step 510 and analyzed. The geometrical factors can be, for example, a curvature of the borehole, e.g., a dogleg, a borehole torsion, or other geometrical factors. The geometrical factors can be put into a functional form to enable usage, such as using Equation 1 or Equation 2.

In step 522, the mechanical factors can be decomposed from the received data from step 510 and analyzed. The mechanical factors can be, for example, a push force, a maximum bending, a maximum bending stress, a fatigue ratio, or other mechanical factors. The mechanical factors can be put into a functional form to enable usage, such as using Equation 1 or Equation 2.

In step 524, the fluid factors can be decomposed from the received data from step 510 and analyzed. The fluid factors can be, for example, a viscous drag, a cuttings drag, or other fluid factors. The fluid factors can be put into a functional form to enable usage, such as using Equation 1 or Equation 2.

In step 526, the geomechanical factors can be decomposed from the received data from step 510 and analyzed. The geomechanical factors can be, for example, a cohesion parameter, a friction angle, an unconfined compressive strength, a Young's modulus, a Poisson's ratio, or other geomechanical factors. The geomechanical factors can be put into a functional form to enable usage, such as using Equation 1 or Equation 2.

Once the selected steps of step 520, step 522, step 524, or step 526 have completed, method 500 proceeds to a step 570. In step 570, the one or more decomposed friction factors can be compared to the estimated single friction factor using the initial input parameters. The output of the comparing can include adjusting the input parameters to generate adjusted input parameters to improve the alignment between the sensor data and the estimated single friction factor. In some aspects, the estimated single friction factor can be calibrated using the comparing.

The various outputs, such as the adjusted input parameters and the calibrated friction factor, can be communicated to one or more other systems and used as input into other processes, for example, a borehole operation plan adjustment process, a well site controller, a geo-steering system, a BHA, a drilling system, a user, or other computing system supporting the well site. In some aspects, the sensor data and initial input parameters can be used to calibrate an estimated single friction factor and generate adjusted input parameters for one or more portions of the borehole. In some aspects, the sensor data and initial input parameters can be used to calibrate an estimated single friction factor and generate adjusted input parameters for one or more borehole operations of the borehole. Method 500 ends at a step 595.

Figure 5B:
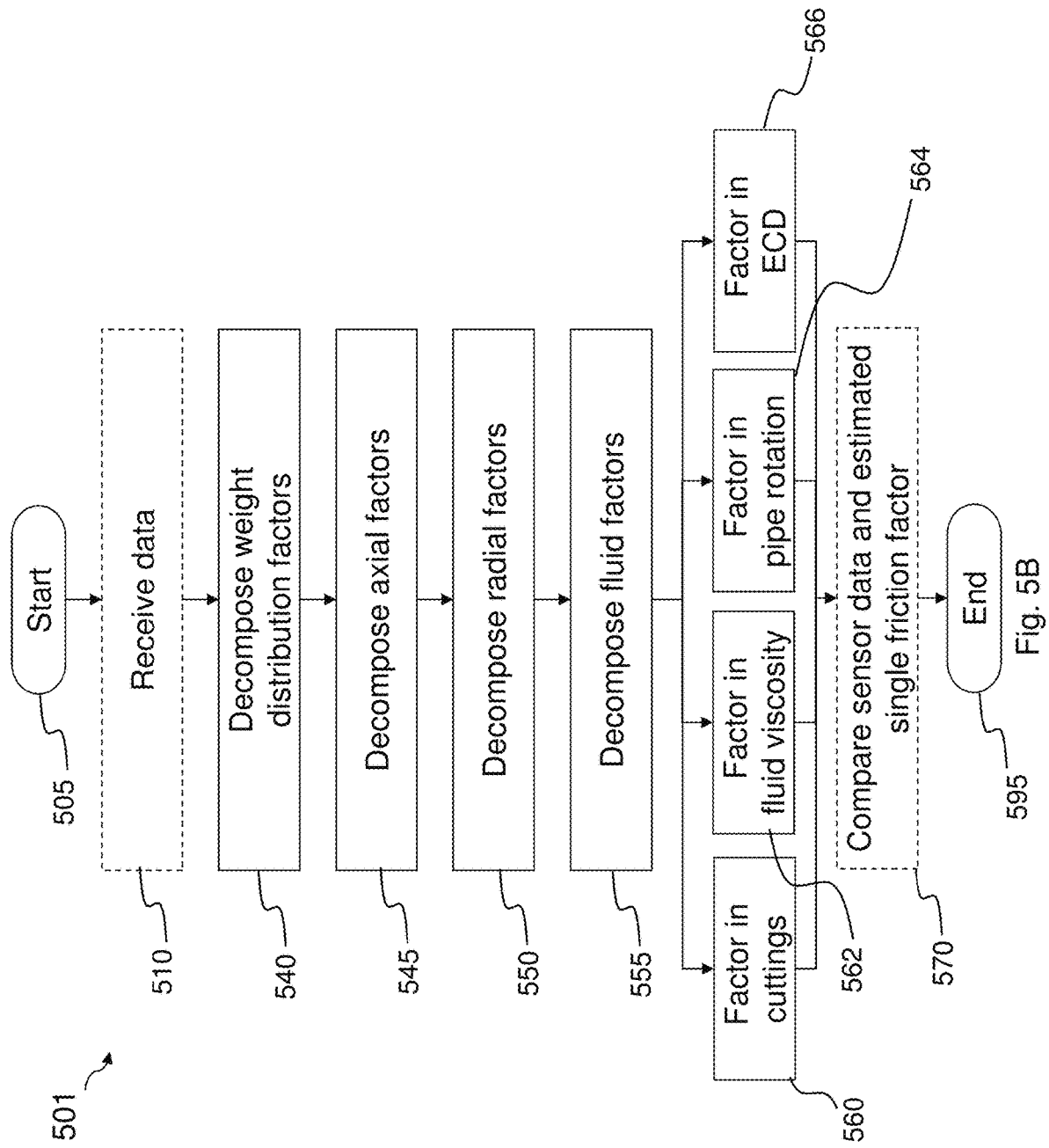
FIG. 5B is an illustration of a flow diagram of an example method for decomposing friction factors using radial and axial factors.

FIG. 5B is an illustration of a flow diagram of an example method 501 for decomposing friction factors using radial and axial factors. Method 501 builds on method 500 of FIG. 5A, where the similar steps are shown using dashed outlined boxes and the new steps are shown using solid outlined boxes. Method 501 can be performed as described for method 500.

Method 501 starts at a step 505 and proceeds to step 510. From step 510, method 501 proceeds to one or more of a step 540, a step 545, a step 550, or a step 555, where each of these steps can be performed serially, in parallel, partially overlapping, or various combinations thereof. The steps selected for performance can vary according to the borehole operation. For example, a stuck drill bit can utilize a different set of decomposed friction factors than an extraction operation.

In step 540, the weight distribution factors can be decomposed from the received data from step 510 and analyzed. The weight distribution factors can be, for example, a single weight distribution curve, a combined weight distribution curve, a stochastic multi-criteria decision analysis curve, or other weight distribution methods. The weight distribution factors can be applied to the outputs of step 545, step 550, or step 555 to determine a range of values that fall within a range interval, for example, one standard deviation. This range of values can be used in an uncertainty analysis since borehole parameters may not be known, are known within a range of values, or have been estimated or approximated.

In step 545, the mechanical friction factors can be decomposed into axial factors, e.g., factors that affect forces along the longitudinal axis of the borehole. In step 550, the mechanical friction factors can be decomposed into radial factors, e.g., factors that affect forces along the radial axis of the borehole. The mechanical factors can be, for example, vibration effects, impact effects, and other mechanical effects on the friction factors. In step 555, the fluid friction factors can be decomposed and analyzed. For example, the fluid friction factors can be decomposed by a step 560 into the cuttings factors, such as cuttings bed, by a step 562 into the fluid viscosity factors, by a step 564 into the pipe rotation factors, and by a step 566 into the equivalent circulating density (ECD) factors. One or more of step 560, step 562, step 564, or step 566 can be selected for execution, and in various orders, and performed serially, in parallel, partially overlapping, or various combinations thereof.

Method 501 proceeds after the selected steps of step 560, step 562, step 564, or step 566 have completed to step 570 where the decomposed friction factors are generated into a calibrated friction factor, e.g., a CRi value. Method 501 ends at step 595.

Figure 6:
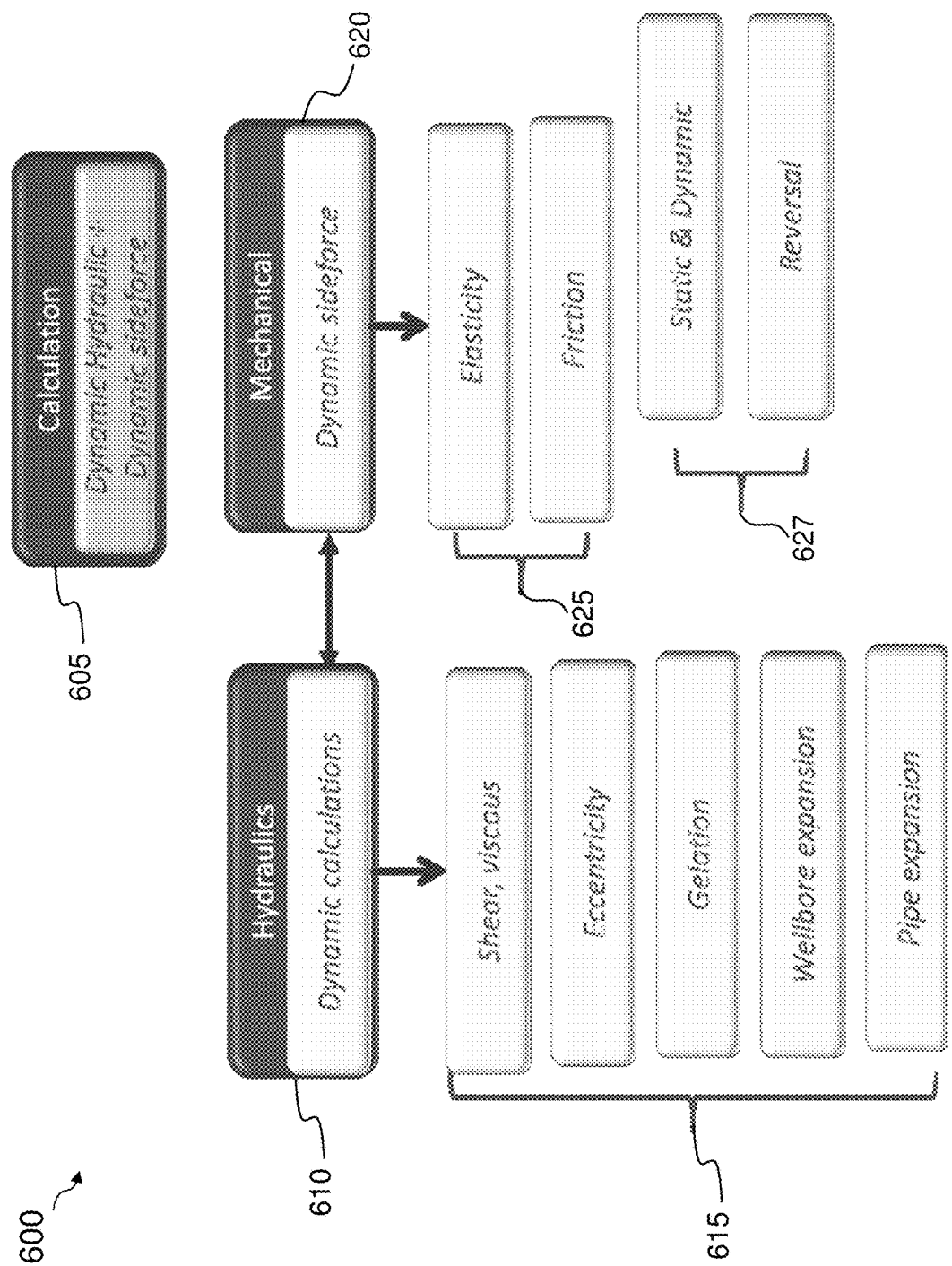
FIG. 6 is an illustration of a flow diagram of example components of a calibrated friction factor.

FIG. 6 is an illustration of a flow diagram of example components 600 of a calibrated friction factor. Components 600 demonstrates a set of friction factors that are relevant for a selected borehole operation. The friction factors are grouped by their hydraulic or mechanical influence on the borehole operation. Components 600 are combined in a calculation 605 to generate a calibrated friction factor. In some aspects, weight distribution factors can be applied to the calculation to form an acceptable deviation threshold for analyzing the decomposed friction factors against an estimated single friction factor. If a decomposed friction factor falls outside of the deviation threshold, then adjustments can be made to the borehole operations to improve the efficiency of the operation at that point in the borehole utilizing the decomposed friction factor data.

Hydraulic friction factors 615 are grouped under the hydraulics 610 section. Hydraulic friction factors 615 can include, but are not limited to, a viscous factor, a viscous shear factor, an eccentricity factor, a gelation factor, a borehole expansion factor, a pipe expansion factor, or other hydraulic friction factors. Mechanical friction factors 625 are grouped under the mechanical 620 section. Mechanical friction factors 625 can include, but are not limited to, an elasticity, a friction, and other mechanical friction factors. Friction can be further detailed by friction section 627, for example, a static friction factor, a rolling friction factor, a sliding friction factor, a dynamic friction factor, a reversal of friction factor, and other friction types.

Figure 7:
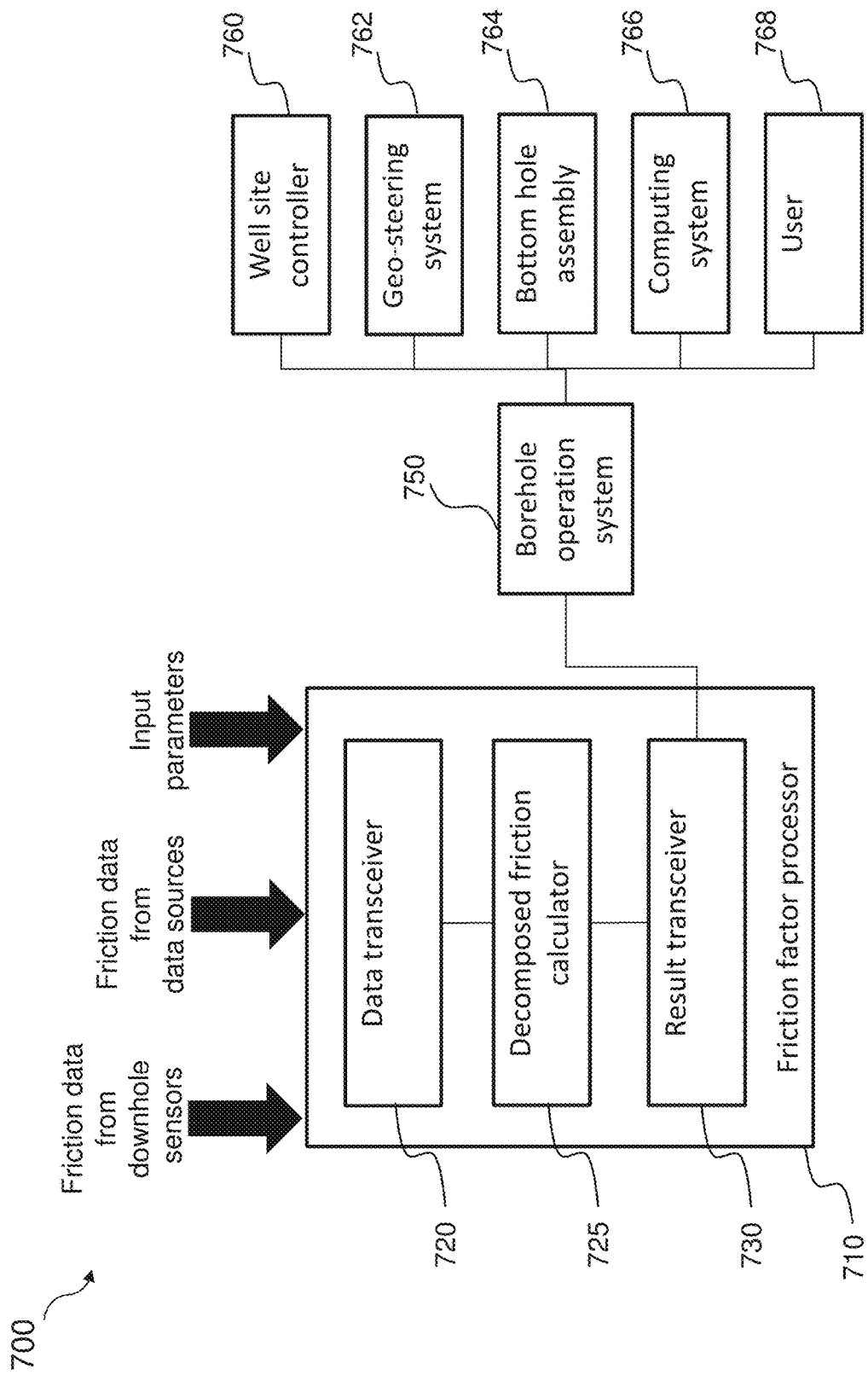
FIG. 7 is an illustration of a block diagram of an example friction factor processing system.

FIG. 7 is an illustration of a block diagram of an example friction factor processing system 700, which can be implemented in one or more computing systems, for example, a well site controller, a reservoir controller, a data center, cloud environment, server, laptop, smartphone, tablet, and other computing systems. The computing system can be located downhole, proximate the well site, or a distance from the well site, such as in a data center, cloud environment, or corporate location. Friction factor processing system 700 can be implemented as an application, a code library, dynamic link library, function, module, other software implementation, or combinations thereof. In some aspects, friction factor processing system 700 can be implemented in hardware, such as a ROM, a graphics processing unit, or other hardware implementation. In some aspects, friction factor processing system 700 can be implemented partially as a software application and partially as a hardware implementation.

Friction factor processing system 700 includes a friction factor processor 710 which further includes a data transceiver 720, a decomposed friction calculator 725, and a result transceiver 730. Data transceiver 720 can receive input parameters, real-time or near real-time friction factors from sensors downhole or at a surface location, friction factors from previous survey data, and friction factors from a data store. Data transceiver 720 is capable of receiving an estimated single friction factor for one or more portions of the borehole, where the estimated single friction factor can be calibrated using the decomposed friction factors.

The input parameters can be parameters, instructions, directions, data, and other information to enable or direct the remaining processing of friction factor processing system 700. For example, the input parameters can include a weight distribution model, a distance interval for performing the methods and processes, one or more types of borehole operations, a set of decomposed friction factors to utilize, and other input parameters. The data store can be one or more data stores, such as a database, data file, memory, server, laptop, server, data center, cloud environment, or other types of data stores located proximate friction factor processor 710 or a distance from friction factor processor 710.

Data transceiver 720 can receive the sensor data from one or more sensors located proximate the drilling system or located elsewhere in the borehole or at a surface location. In some aspects, data transceiver 720 can receive various data from a computing system, for example, when a controller or computing system collects the data from the sensors and then communicates the data to data transceiver 720. The measurements collected by the sensors can be transformed into sensor data by the sensors, data transceiver 720, or another computing system, e.g., the sensor data can be derived from the sensor measurements collected at a downhole location of the borehole or at a surface location proximate the borehole.

Result transceiver 730 can communicate one or more calculated results, e.g., result parameters, to one or more other systems, such as a geo-steering system, a geo-steering controller, a well site controller, a computing system, a BHA, drilling system, a user, or other borehole related systems. Other borehole related systems can include a computing system where friction factor processor 710 is executing or be located in another computing system proximate or a distance from friction factor processor 710. Data transceiver 720 and result transceiver 730 can be, or can include, conventional interfaces configured for transmitting and receiving data. In some aspects, data transceiver 720 and result transceiver 730 can be combined into one transceiver.

Decomposed friction calculator 725 can implement the methods, processes, analysis, equations, and algorithms as described herein utilizing the received data and input parameters to determine the appropriate set of decomposed friction factors to analyze, apply weight distribution models to selected decomposed friction factors, and generate a calibrated friction factor using the decomposed friction factors. Decomposed friction calculator 725 can use one or more algorithms, such as machine learning, decision tree, random forest, logistic regression, linear, stochastic, and other statistical algorithms. In some aspects, decomposed friction calculator 725 can calibrate an estimated single friction factor using the decomposed friction factors. In some aspects, decomposed friction calculator 725 can utilize a weight distribution model to ascertain whether a decomposed friction factor exceeds a deviation threshold along a portion of the distance interval. In some aspects, the weight distribution deviation threshold and the portion of the decomposed friction factor falling outside of the deviation threshold can be communicated as part of the results to other borehole systems.

A memory or data storage of decomposed friction calculator 725 or friction factor processor 710 can be configured to store the processes and algorithms for directing the operation of decomposed friction calculator 725.

The results from friction factor processor 710 can be communicated to another system, such as a borehole operation system 750. Borehole operation system 750 can be one or more of a well site controller 760, a geo-steering system 762, a BHA 764, a computing system 766, or a user 768. The results can be used to direct the borehole operation system 750 in improving the efficiency of the borehole operation, such as adjusting the borehole operation plan.

A portion of the above-described apparatus, systems or methods may be embodied in or performed by various analog or digital data processors, wherein the processors are programmed or store executable programs of sequences of software instructions to perform one or more of the steps of the methods. A processor may be, for example, a programmable logic device such as a programmable array logic (PAL), a generic array logic (GAL), a field programmable gate arrays (FPGA), or another type of computer processing device (CPD). The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

Portions of disclosed examples or embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floppy disks; and hardware devices that are specially configured to store and execute program code, such as ROM and RAM devices. Examples of program code include both machine code, such as produced by a compiler, and files containing higher level code that may be executed by the computer using an interpreter.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions and modifications may be made to the described embodiments. It is also to be understood that the terminology used herein is for the purpose of describing particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

Aspects disclosed herein include:

A. A method to calibrate an estimated single friction factor for a borehole operation, including (1) receiving data, wherein the data includes initial input parameters and sensor data, (2) decomposing the sensor data into one or more decomposed friction factors using the initial input parameters, and (3) comparing the one or more decomposed friction factors to the estimated single friction factor using the initial input parameters, wherein the initial input parameters are modified to generate adjusted input parameters using results of the comparing, where the one or more decomposed friction factors and the estimated single friction factor apply to a same portion of a borehole undergoing the borehole operation.

B. A system to adjust a borehole operation utilizing a calibrated friction factor, including (1) a data transceiver, capable of receiving initial input parameters and sensor data from one or more of downhole sensors, surface sensors, a data store, a previous survey data, a well site controller, or a first computing system, (2) a result transceiver, capable of communicating the calibrated friction factor, one or more decomposed friction factors, and adjusted input parameters to a borehole operation system, and (3) a decomposed friction calculator, capable of using the sensor data and the initial input parameters to decompose the sensor data to generate one or more decomposed friction factors, to modify the initial input parameters to generate the adjusted input parameters, and to generate the calibrated friction factor.

C. A computer program product having a series of operating instructions stored on a non-transitory computer-readable medium that directs a data processing apparatus when executed thereby to perform operations to calibrate an estimated single friction factor for a borehole operation, the operations including (1) receiving data, wherein the data includes initial input parameters and sensor data, (2) decomposing the sensor data into one or more decomposed friction factors using the initial input parameters, and (3) comparing the one or more decomposed friction factors to the estimated single friction factor using the initial input parameters, wherein the initial input parameters are modified to generate adjusted input parameters using results of the comparing, where the one or more decomposed friction factors and the estimated single friction factor apply to a same portion of a borehole undergoing the borehole operation.

Each of aspects A, B, and C can have one or more of the following additional elements in combination. Element 1: adjusting a borehole operation plan of the borehole using the estimated single friction factor and the adjusted input parameters. Element 2: identifying an outlier portion of the one or more decomposed friction factors using the initial input parameters, wherein the initial input parameters include a deviation threshold. Element 3: calibrating the estimated single friction factor using the comparing to generate a calibrated friction factor. Element 4: communicating the calibrated friction factor and the adjusted input parameters to a second system of the borehole, wherein the adjusting utilizes the calibrated friction factor and the adjusted input parameters. Element 5: wherein the initial input parameters include a weight distribution model. Element 6: wherein the sensor data is derived from sensor measurements collected at a downhole location of the borehole or at a surface location proximate the borehole. Element 7: wherein the sensor data is received from a data store. Element 8: wherein the one or more decomposed friction factors include one or more of one or more of geometrical factors, one or more of mechanical factors, one or more of fluid factors, or one or more of geomechanical factors. Element 9: wherein the one or more decomposed friction factors include one or more of axial factors, radial factors, fluid factors, or weight distribution factors. Element 10: wherein the fluid factors include one or more of cuttings factors, fluid viscosity factors, pipe rotation factors, or equivalent circulating density factors. Element 11: wherein the sensor data includes a hydraulic set of friction factors comprising one or more of a shear factor, a viscous factor, an eccentricity factor, a gelation factor, a borehole expansion factor, or a pipe expansion factor. Element 12: wherein the sensor data includes a mechanical set of friction factors comprising one or more of an elasticity factor, a static friction factor, a dynamic friction factor, or a reversal of friction factor. Element 13: wherein the method is performed for two or more borehole operations as determined by the initial input parameters. Element 14: wherein the borehole operation system is further capable of adjusting a borehole operation plan. Element 15: wherein the borehole operation system is one or more of the well site controller, a geo-steering system, a bottom hole assembly, the first computing system, a second computing system, or a user. Element 16: wherein the decomposed friction calculator is further capable of determining a weight distribution factor for selected of the one or more decomposed friction factors. Element 17: wherein the decomposed friction calculator is further capable of identifying a portion of the one or more of the decomposed friction factors that exceeds a deviation threshold. Element 18: wherein the result transceiver is further capable of communicating the portion of the one or more of the decomposed friction factors.

What is claimed is:

1. A method to calibrate an estimated single friction factor for a borehole operation, comprising:
    receiving data, wherein the data includes initial input parameters and sensor data;
    decomposing the sensor data into one or more decomposed friction factors using the initial input parameters;
    comparing the one or more decomposed friction factors to the estimated single friction factor using the initial input parameters, wherein the initial input parameters are modified to generate adjusted input parameters using results of the comparing, where the one or more decomposed friction factors and the estimated single friction factor apply to a same portion of a borehole undergoing the borehole operation; and
    adjusting a borehole operation plan of the borehole using the estimated single friction factor and the adjusted input parameters.

2. The method as recited in claim 1, further comprising: identifying an outlier portion of the one or more decomposed friction factors using the initial input parameters, wherein the initial input parameters include a deviation threshold.

3. The method as recited in claim 2, further comprising: calibrating the estimated single friction factor using the comparing to generate a calibrated friction factor; and communicating the calibrated friction factor and the adjusted input parameters to a second system of the borehole, wherein the adjusting utilizes the calibrated friction factor and the adjusted input parameters.

4. The method as recited in claim 1, wherein the initial input parameters include a weight distribution model.

5. The method as recited in claim 1, wherein the sensor data is derived from sensor measurements collected at a downhole location of the borehole or at a surface location proximate the borehole.

6. The method as recited in claim 1, wherein the sensor data is received from a data store.

7. The method as recited in claim 1, wherein the one or more decomposed friction factors include one or more of one or more of geometrical factors, one or more of mechanical factors, one or more of fluid factors, or one or more of geomechanical factors.

8. The method as recited in claim 1, wherein the one or more decomposed friction factors include one or more of axial factors, radial factors, fluid factors, or weight distribution factors.

9. The method as recited in claim 8, wherein the fluid factors include one or more of cuttings factors, fluid viscosity factors, pipe rotation factors, or equivalent circulating density factors.

10. The method as recited in claim 1, wherein the sensor data includes a hydraulic set of friction factors comprising one or more of a shear factor, a viscous factor, an eccentricity factor, a gelation factor, a borehole expansion factor, or a pipe expansion factor.

11. The method as recited in claim 1, wherein the sensor data includes a mechanical set of friction factors comprising one or more of an elasticity factor, a static friction factor, a dynamic friction factor, or a reversal of friction factor.

12. The method as recited in claim 1, wherein the method is performed for two or more borehole operations as determined by the initial input parameters.

13. A system to adjust a borehole operation utilizing a calibrated friction factor, comprising:
    a data transceiver, capable of receiving initial input parameters and sensor data from one or more of downhole sensors, surface sensors, a data store, a previous survey data, a well site controller, or a first computing system;
    a result transceiver, capable of communicating the calibrated friction factor, one or more decomposed friction factors, and adjusted input parameters to a borehole operation system, wherein the borehole operation system is further capable of adjusting a borehole operation plan; and
    a decomposed friction calculator, capable of using the sensor data and the initial input parameters to decompose the sensor data to generate the one or more decomposed friction factors, to modify the initial input parameters to generate the adjusted input parameters, and to generate the calibrated friction factor.

14. The system as recited in claim 13, wherein the borehole operation system is one of a surface system or a downhole system.

15. The system as recited in claim 13, wherein the borehole operation system is one or more of the well site controller, a geo-steering system, a bottom hole assembly, the first computing system, or a second computing system.

16. The system as recited in claim 13, wherein the decomposed friction calculator is further capable of determining a weight distribution factor for selection of the one or more decomposed friction factors.

17. The system as recited in claim 13, wherein the decomposed friction calculator is further capable of identifying a portion of the one or more decomposed friction factors that exceeds a deviation threshold, and wherein the result transceiver is further capable of communicating the portion of the one or more decomposed friction factors.

18. A computer program product having a series of operating instructions stored on a non-transitory computer-readable medium that directs a data processing apparatus when executed thereby to perform operations to calibrate an estimated single friction factor for a borehole operation, the operations comprising:
    receiving data, wherein the data includes initial input parameters and sensor data;
    decomposing the sensor data into one or more decomposed friction factors using the initial input parameters;
    comparing the one or more decomposed friction factors to the estimated single friction factor using the initial input parameters, wherein the initial input parameters are modified to generate adjusted input parameters using results of the comparing, where the one or more decomposed friction factors and the estimated single friction factor apply to a same portion of a borehole undergoing the borehole operation;
    adjusting a borehole operation plan of the borehole using the estimated single friction factor and the adjusted input parameters.

19. The computer program product as recited in claim 18, further comprising:
    identifying an outlier portion of the one or more decomposed friction factors using the initial input parameters, wherein the initial input parameters include a deviation threshold; and
    calibrating the estimated single friction factor using the comparing to generate a calibrated friction factor.

20. The computer program product as recited in claim 19, further comprising:
    communicating the calibrated friction factor and the adjusted input parameters to a second system of the borehole, wherein the adjusting utilizes the calibrated friction factor and the adjusted input parameters.

* * * * *